Nov. 28, 1967  L. S. TAYLOR ET AL  3,354,719
FLOAT FOR LIQUID LEVEL GAGE
Filed March 26, 1965
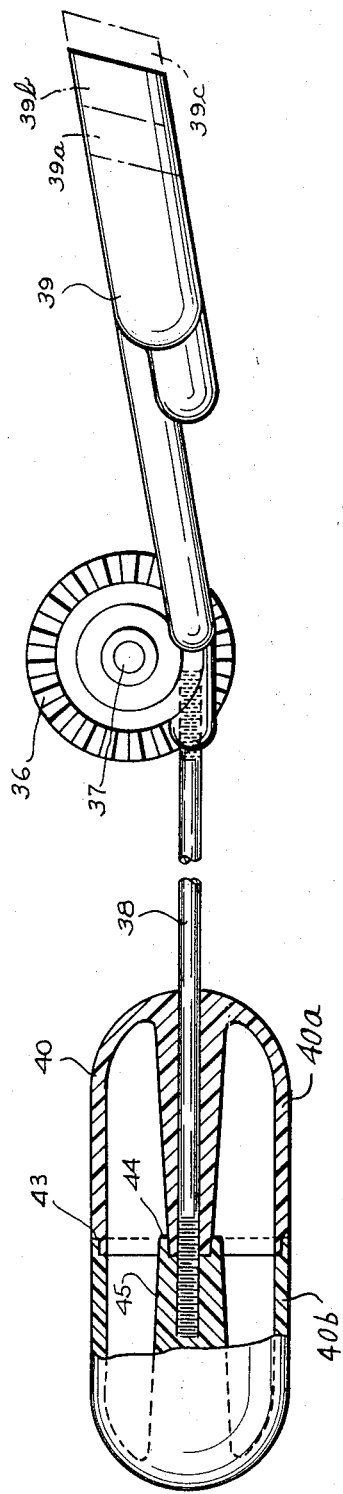
INVENTORS.
LETA S. TAYLOR
PAUL B. JOHNSON
EUGENE D. HUSKEY
BY
Raymond A. Paquin
ATTORNEY.

United States Patent Office 3,354,719
Patented Nov. 28, 1967

3,354,719
FLOAT FOR LIQUID LEVEL GAGE
Leta S. Taylor, Paul B. Johnson, and Eugene D. Huskey, Garland, Tex., assignors to J. Y. Taylor Mfg. Company, a corporation of Texas
Filed Mar. 26, 1965, Ser. No. 442,870
1 Claim. (Cl. 73—322.5)

ABSTRACT OF THE DISCLOSURE

A float means for a liquid level gauge in which the operating rod and part of the float is made as a standard part and the remainder of the float may be as selected according to the degree of buoyancy required.

---

An object of the invention is to provide a new and improved float arrangement for liquid level gages of the type set forth which is simpler and more economical in construction, yet efficient in operation.

Another object is to provide a new and improved float arrangement of the type set forth which allows its use in a greater range of fluids without damage to the gage components than prior type gages.

Another object is to provide a new and improved float arrangement which may be adapted for use with various storage tanks and/or fluids or liquified gases.

Another object is to provide a new and improved float arrangement for a liquid level gage, which float is adapted to withstand the internal pressures of gases in such tanks, and which float is relatively simple and economical in construction but will also resist chemical reaction from the liquified gases or liquids in the tank, and which enables its uses in a greater range of liquids.

Another object is to provide a new and improved float for liquid level gages which is formed of a material which will allow the assembly of components in such manner as by chemical means to thereby allow such components to become effectively integral.

Another object is to provide a new and improved process of making a float for a liquid level gage and for assembling said float.

Another object is to provide a new and improved process of assembling the components of a float for a liquid level gage to obtain an effectively unitary construction.

Other objects and advantages of the invention will be apparent from the following description taken in connection with the accompanying drawings wherein a preferred form of the invention is shown by way of illustration only.

The figure shows a float assembly partly in section showing the preferred embodiment of the float.

As seen in the drawing the present invention is a float 40 connected to a float rod 38, the float rod being adapted to rotate a gear 36 mounted on a pivot 37 of a gauge structure not illustrated. A counterweight 39 is also mounted on gear 36 in a well known manner.

Float 40 is of chemical resistant plastic and can be secured to float rod 38 where such rod is of metal and can be cast or molded thereon or molded integral therewith when said rod 38 is made of plastic.

The float is constructed of two portions 40a and 40b joined together at 43 to form an effectively integral float which does not leak.

By controlling the size and weight of float portion 40b the float can be adapted to the particular gage on which it is to be employed.

The float portions 40a and 40b are cast or molded of chemically resistant plastic elsewhere specified herein.

The float is molded with threaded float rod 38. The end section 40b of the float has a projection 45 which threads onto float rod 38 and is joined and sealed at internal projections 44 to a projection in float portion 40a and at flanged outer rims 43. The projections on float portions 40b and 40a are in aligned relation. The float rod 38 extends through the projection in float portion 40a and is sealed therein.

The counterweight 39 can be cast of chemically resistant plastic and the length can be controlled according to the sections indicated at 39, 39a, 39b or 39c depending upon the float 40 employed, the length of rod 38, and the material of which the float and counterweight are constructed.

Plastics which might be employed depending upon the material with which the gage is to be used are polycarbonates, polystyrenes, acrylics, vinyls or others with suitable properties.

From the foregoing it will be seen that we have provided new and improved means and process for obtaining all of the objects and advantages of the invention.

We claim:

A float arrangement for a liquid level gauge, said float being connected to a float rod, and comprising, two opposed hollow portions of chemical resistant plastic secured together to form an effectively unitary float, each of said opposed hollow portions having an internal projection with said internal projections being in aligned relation and having their adjacent ends in interengaging relation and said float rod extending through and sealed in one of said internal projections and being secured by screw threads on said rod engaging screw threads formed in the other of said internal projections, and actuating means connected to said float rod and actuated thereby.

References Cited
UNITED STATES PATENTS

| | | | |
|---|---|---|---|
| 1,714,733 | 5/1929 | Shank | 73—322.5 |
| 1,727,525 | 9/1929 | Thompson et al. | 73—322.5 |
| 2,358,472 | 9/1944 | Owens | 73—317 |
| 2,415,692 | 2/1947 | Huston | 73—322.5 |
| 2,473,581 | 6/1949 | Ford | 73—317 XR |
| 3,112,730 | 12/1963 | Inscho | 73—322.5 XR |
| 3,306,106 | 2/1967 | Glasgow | 73—322.5 |

LOUIS R. PRINCE, Primary Examiner.

DAMIEL YASICH, Assistant Examiner.